United States Patent [19]

Date et al.

[11] 3,855,349
[45] Dec. 17, 1974

[54] METHOD AND COMPOSITION FOR IMPARTING FIRE-PROOFNESS TO SYNTHETIC SHAPED ARTICLES

[75] Inventors: Masakazu Date; Shigeki Fukuoka, both of Takatsuki, Japan

[73] Assignee: Toyo Boseki Kabushiki Kaisha, Kita-ku, Osaka, Japan

[22] Filed: Mar. 17, 1972

[21] Appl. No.: 235,861

[30] Foreign Application Priority Data
Mar. 22, 1971 Japan.............................. 46-16614
Dec. 21, 1971 Japan............................ 46-104421

[52] U.S. Cl.................. 260/849, 117/136, 252/8.1, 260/67.6 R, 260/68, 260/70 R
[51] Int. Cl. .................... D06m 13/28, D06m 13/44
[58] Field of Search ....... 260/849; 252/8.1; 117/136

[56] References Cited
UNITED STATES PATENTS

| | | | |
|---|---|---|---|
| 2,812,311 | 11/1957 | Reeves et al..................... | 260/849 |
| 3,681,124 | 8/1972 | Sello et al......................... | 117/136 |
| 3,644,083 | 2/1972 | Stockel et al...................... | 252/8.1 |
| 3,101,278 | 8/1963 | Wagner............................... | 252/8.1 |
| 2,927,050 | 3/1960 | Reeves et al...................... | 260/849 |
| 2,810,701 | 10/1957 | Reeves et al...................... | 260/849 |
| 2,772,188 | 11/1956 | Reeves et al...................... | 260/849 |

*Primary Examiner*—John C. Bleutge
*Attorney, Agent, or Firm*—Wenderoth, Lind & Ponack

[57] ABSTRACT

The invention relates to a composition suitable for rendering a shaped article of a synthetic resin fireproof, which comprises 1. a. a precondensate of a tetrakis hydroxymethyl phosphonium compound and urea or
   b. a precondensate of a tetrakis hydroxymethyl phosphonium compound, urea and melamine or guanidine,
2. a compound having at least two amino groups in the molecule and
3. a methylol resin precondensate having at least one methylol group in the molecule.

The invention also includes method of rendering the resin article fireproof with said composition.

1 Claim, No Drawings

METHOD AND COMPOSITION FOR IMPARTING FIRE-PROOFNESS TO SYNTHETIC SHAPED ARTICLES

This invention relates to a method for imparting fire-proofness to a shaped article of a synthetic resin and also relates to a composition to be used therefor.

It is known to treat a shaped article of a synthetic resin with various phosphates or halophosphates to render the article flame-resistant or retardant. However, the effect is poor in the durability. In fact when the article is subjected to laundering, the agent on the article drops off and therefore the flame-retardant effect is quickly reduced.

On the other hand, for products containing cellulosic fibers, it is known to treat the same with a precondensate of a tetrahis hydroxymethyl phosphonium compound (which will be referred to as THP hereinafter) and melamine and/or urea or guanidine (British Pat. Nos. 938,989 and 882,993). According to this method, a cellulosic textile product is applied with a solution prepared by adding a hydroxide of an alkali metal to an aqueous solution of the above mentioned precondensate. Then the textile product is dried to a predetermined water content and is then exposed to an ammonia gas or dipped in an aqueous solution of ammonia. This method is effective to cellulosic textile products but is not so useful for a synthetic resin article because the flame-retardant or resistant effect is lost when the article is laundered.

It is also known to apply a precondensate of THP and melamine and/or urea or guanidine to a cellulosic textile product, which is then heat-treated (British Pat. Nos. 761,985 and 764,312). However, this method again is not satisfactorily applicable to an article of a synthetic resin because the fastness or durability of the flame-resistant effect is poor, said effect being quickly reduced when laundered.

Therefore it is an object of the present invention is to provide a composition and method for imparting a durable high fire-proofness to synthetic resin articles.

Another object of the present invention is to provide a method for imparting a durable high fire-proofness to an article comprising a synthetic resin and a cellulosic or proteinic polymer.

Other objects of this invention will be apparent from the following description.

Briefly, this invention provides a composition which comprises (1) (a) preconcensate of a tetrakis hydroxymethyl phosphonium compound and urea or (b) a precondensate of a tetrakis hydroxymethyl phosphonium compound and urea and melamine or guanidine, (2) a compound having at least two amino groups in the molecule and (3) a methylol resin precondensate having at least one methylol group in the molecule.

This invention further provides a method for imparting fire-proofness (flame-resistance, flame-retardance and the like) to a shaped article of a synthetic resin which comprises applying an aqueous solution of the above mentioned composition to the shaped article, which is then heat-treated.

One of the important features of this invention is in the use of a compound having at least two amino groups in the molecule in the fire-proof-finish of a synthetic resin shaped article. By the use of this compound, the fastness or durability of the flame-retardant on the shaped article, particularly laundry fastness is remarkably improved as will be demonstrated in the Examples to be given hereinlater.

The shaped articles to which the present invention is applicable include yarns, woven fabrics, knitted fabrics, nonwoven fabrics, papers, films and the like made from various polymers such as polyesters, for example polyethylene terephthalate, polyethylene terephthalate isophthalate and polyethylene terephthalate parahydroxyethoxybenzoate; polyamides such as poly-$\epsilon$-caprolactam and polyhexamethylene adipamide; acrylic polymers such as polyacrylonitrile, acrylonitrile-vinyl acetate copolymer and acrylonitrilevinyl chloride copolymer; polyolefins such as polyethylene and polypropylene; vinyl polymers such as polyvinyl chloride, polyvinylidene chloride, polystyrene and polyacrylate; polycarbonates such as polycarbonate obtained from bis-phenol A and phosgene; polyurethanes such as polyurethane derived from polyethylene oxide and polyisocyanate; polyethers such as polyethylene oxide; and cellulose derivatives such as cellulose acetate. This invention may also be applicable to shaped articles made from a mixture of one or more of the above polymers with cellulose or protein, for example, blended yarns, blended woven or knitted fabrics, mixed woven or knitted fabrics and composite films.

The above mentioned condensate (1) may be prepared in a manner known per se. Thus for example, a mixture of the two substances i.e. THP and urea or a mixture of the three substances i.e. THP, urea and melamine or of THP, urea and guanidine is caused to react in an aqueous solution at a temperature of about 100°C. for at least 10 minutes. The particularly preferable reaction condition is at 100° to 108°C. for 30 to 60 minutes. Further, it is preferable that the concentration of THP in the reaction solution is 30 – 70 % by weight.

The proportions of THP, urea, melamine and guanidine to be used are so selected that the equivalent ratio of the amount of the methylol groups in THP to the amount of the amino groups in the three others is 1:0.1 to 0.5, preferably 1:0.2 to 0.35. In case this equivalent ratio is 1:not more than 0.1, the fastness or durability of the fireproof effect against laundering will become low. On the contrary, if said ratio is 1:not less than 0.5, the reaction mixture will gel to form a water-insoluble product during the reaction.

Examples of THP to be used in the present invention are tetrakis hydroxymethyl phosphonium chloride (THP C), tetrakis hydroxymethyl phosphonium hydroxide (THPOH), tetrakis hydroxymethyl phosphonium acetate (THPA) and tetrakis hydroxymethyl phosphonium phosphate.

The guanidine to be used for the preparation of the precondensate (1) may be in the form of guanidine carbonate, guanidine phosphate or guanidine hydrochloride.

As for the compound (2) having at least two amino groups in the molecule, there may be enumerated urea, thiourea, guanidine carbonate, guanidine phosphate and guanidine hydrochloride. The amount of such compound (2) to be used is preferably 2 to 20 parts per 100 parts by weight of the precondensate (1). If the amount is higher or lower than the above mentioned, the resulting composition on the shaped article will be low in the durability or fastness.

For the methylol resin precondensate (3) having at least one methylol group in the molecule, there can be enumerated precondensates of methylolmelamine to resin, methylolurea resin, methyloluron resin, methyloltriazone resin, methylolethyleneurea resin, methylolpropyleneurea resin and methylolhydroxyethyleneurea resin. It is preferable to use 2 to 15 parts of such resin precondensate (3) per 100 parts by weight of the first mentioned precondensate (1).

The composition comprising the above explained ingredients (1), (2) and (3) is applied to a shaped article in the form of an aqueous solution. It is preferable to keep the treating solution at a pH of 4 to 8. Therefore, if necessary, an alkaline substance which is inert to the composition such as hydroxide of an alkali metal, for example, sodium hydroxide or potassium hydroxide is added to the treating solution to adjust the pH.

If desired a latent acid catalyst such as zinc nitrate, magnesium chloride cetyl amine or an organic amine hydrochloride may be added to the treating solution.

The treating solution may be applied to the article by any suitable means such as padding, spraying or coating.

The content of the composition (as solid) in the treating solution is generally 10 – 40 %, preferably 20 – 35 % by weight.

It is preferable that the solution is applied to the article so that the article retains about 60 to 90 % by weight of the composition (as solid).

Then the article is dried and heat-treated. Preferably the drying is conducted at 70°– 100°C. for 3 – 10 minutes and the heat-treatment is conducted at 120° to 180°C. for 30 seconds to 5 minutes.

By the above treatment the shaped article, particularly textile product is rendered fire-proof (flameresistant or fire-retardant) and the effect of fire-proofness is high in durability or fastness, particularly against laundering.

The fire-proofing effect is further enhanced when the material (synthetic resin, cellulosic derivative, etc.) from which the shaped article is to be formed contains a known fire-retardant such as halogen-containing fireretardant.

Further, when the textile product to be treated according to this invention contains cellulosic or proteinous fibers such as cellulose/synthetic fibers mixed- or bendedtextile product, it is preferable that the cellulosic or proteinous fibers are pretreated or applied with a known fire-retardant which is reactive with such cellulosic or proteinous fibers and then the textile product is subjected to the treatment of this invention. However, it is preferable to wash the product before conducting the treatment according to this invenntion.

As flame-retardants for cellulose fibers to be used for the above purpose, there can be enumerated N-methylol dialkylphosphonocarboxylic acid amide, precondensate of trisazylidinylphosphine oxide and methylolmelamine and precondensate of tris-N-alkylphosphoric triamide and methylolmelamine.

In conducting such pretreatment, the textile product containing cellulosic fibers is padded in an ordinary manner with a processing solution prepared by adding a necessary assistant and catalyst to the solution of the above mentioned flame-resisting or retardant agent and is dried, heat-treated and washed. This washing is strongly recommended to remove unreated substances on the synthetic fibers.

The present invention will be explained by referring to the following examples.

EXAMPLE 1

A solution consisting of 2,560 g. of 98 % aqueous solution of tetrakis hydroxymethyl phosphonium chloride (referred to as THPC hereinafter), 325 g. of urea, 82 g. of melamine and 1,820 g. of water was heated under reflux for 60 minutes and then quenched to prepare a THPC-urea-melamine precondensate (A).

A solution consisting of 2,250 g. of an 80 % aqueous solution of THPC, 320 g. of urea and 1,550 g. of water was heated under reflux for 30 minutes and was then quenched to prepare a THPC-urea precondensate (B).

A poplin consisting of 100 % polyethylene terephthalate fibers was padded with each of the treating solutions as indicated in Table 1 and was squeezed to a wet pick up of 75 to 80 %. The wet fabric was dried at 80°C. for 8 minutes, then heat-treated at 150°C. for 3 minutes and was soaped with a bath of 1 g./liter of Soapless Soap (product of Kao Soap Co., Ltd.) at 40 C. for 5 minutes in a domestic laundering machine. The fire-proofness of each treated fabric was as shown in Table 1.

As apparent from Table 1, when treated with a solution to which no urea is added, no sufficient fire-proofness is obtained. The fire-proofness of an untreated fabric is 1.0.

TABLE 1

| | | Test No. | Present invention | | | | Controls | | |
|---|---|---|---|---|---|---|---|---|---|
| | | | 1 | 2 | 3 | 4 | 5 | 6 | 7 |
| Formulation | Precondensate A | (g.) | 100 | — | 100 | — | 100 | — | 100 |
| | Precondensate B | (g.) | — | 100 | — | 100 | — | 100 | — |
| | NaOH | (g.) | 1.3 | 1.3 | 1.3 | 1.3 | 1.3 | 1.3 | 1.3 |
| | Urea | (g.) | 5 | 5 | 10 | 10 | 0 | 0 | 0 |
| | Sumitex Resin*¹ M-3 | (g.) | 7 | 7 | 0 | 0 | 0 | 0 | 7 |
| | Water | (g.) | 40 | 40 | 42 | 42 | 52 | 52 | 45 |
| Fire-proofness*² (average value of 4 measurements) | Before laundering | | 6.0 | 6.0 | 6.5 | 6.5 | 3.0 | 1.0 | 2.8 |
| | After 5 times laundering | | 5.5 | 5.0 | 5.8 | 5.0 | 2.0 | 1.0 | 1.5 |

TABLE 1—Continued

| | Test No. | Present invention | | | | Controls | | |
|---|---|---|---|---|---|---|---|---|
| | | 1 | 2 | 3 | 4 | 5 | 6 | 7 |
| Results | | | | | | | | |
| Amount of phosphorus*3 (%) | Before laundering | 2.5 | 2.6 | 3.0 | 2.9 | 1.7 | 0 | 1.5 |
| | After 5 times laundering | 2.2 | 2.2 | 2.6 | 2.2 | 1.1 | 0 | 0.7 |

*1: A methylol melamine resin precondensate (product of Sumitomo Chemical Company, Limited, Osaka, Japan).
*2: By Japanese Industrial Standard (JIS) L-1091-1971- Method D wherein a moisture conditioned sample fabric (width 100 mm., weight 1 g.) was rolled to be of a width of 100 mm. and inserted into a test piece supporting coil and was held at an inclination of 45 degrees. Then the test piece was heated with a flame (whose length was adjusted so as to be 45 mm. in the absence of the supporting coil) of a burner adjusted to be in a position in which the flame was in contact with the lowermost end of the test piece within the test piece supporting coil until the test piece stopped burning while melting. Then the burner was adjusted to be in a position in which the flame was in contact with the remaining lowermost end of the test piece, and the same test was conducted. This operation was repeated until the part 90 mm. from the lower end of the test piece melted and burned and the fire-proofness was indicated with the number of the repetitions.
*3: By a colorimetric method with molybdic acid.

EXAMPLE 2

A twill consisting of polyethylene terephthalate fibers and cotton fibers (65/35) was treated in the same manner as in Example 1. The results were as shown in Table 2.

Table 2

| | | | Present invention | | | | Controls | |
|---|---|---|---|---|---|---|---|---|
| | Test No. | | 1 | 2 | 3 | 4 | 5 | 6 |
| Formulation | Precondensate A | (g.) | 100 | — | 100 | — | 100 | — |
| | Precondensate B | (g.) | — | 100 | — | 100 | — | 100 |
| | NaOH | (g.) | 1.3 | 1.3 | 1.3 | 1.3 | 1.3 | 1.3 |
| | Urea | (g.) | 5 | 5 | 10 | 20 | 0 | 0 |
| | Sumitex M-3 | (g.) | 7 | 7 | 0 | 0 | 0 | 0 |
| | Water | (g.) | 40 | 40 | 42 | 42 | 52 | 52 |
| Results | Fire-proofness*4 (Char length, cm.) | Before laundering | 10.9 | 11.6 | 9.8 | 8.8 | All burned out | All burned out |
| | | After 5 times laundering | 11.6 | 12.1 | 11.1 | 10.2 | do. | do. |

*4: The fire-proofness was measured by JIS-L-1091-1971-Method A-4 (vertical method) (average value of 3 measurements) wherein a moisture conditioned test piece (70 mm. × 300 mm.) was held with a test piece holder, which was adjusted so that the lower end of the test piece is at a height of 19 mm. above the mouth of a burner (adjusted so that the length of the flame is 38 mm. in the absence of the test piece holder). Then the flame was contacted with the middle of the width of the test piece to heat the same for 12 seconds, and then the flame was removed. Then a predetermined load was fitted to one side of the part remaining unburned of the lower end of the test piece, the other side was lifted, and the length from the lower end of the test piece to the torn tip was measured to determine the char length.

*4: The fire-proofness was measured by JIS-L-1091-1971-Method A-4 (vertical method) (average value of 3 measurements) wherein a moisture conditioned test piece (70 mm. × 300 mm.) was held with a test piece holder, which was adjusted so that the lower end of the test piece is at a height of 19 mm. above the mouth of a burner (adjusted so that the length of the flame is 38 mm. in the absence of the test piece holder). Then the flame was contacted with the middle of the width of the test piece to heat the same for 12 seconds, and then the flame was removed. Then a predetermined load was fitted to one side of the part remaining unburned of the lower end of the test piece, the other side was lifted, and the length from the lower end of the test piece to the torn tip was measured to determine the char length.

As will be noted from Table 2, even if treated with a treating solution to which no urea is added, no sufficient fire-proofness is obtained.

EXAMPLE 3

A solution consisting of 1280 g. of an 80 % aqueous solution of THPC, 246 g. of guanidine carbonate, 41 g. of melamine and 910 g. of water was heated under reflux for 60 minutes and was then quenched to prepare a precondensate (C). When the same treatment as in Example 2 was repeated by using this precondensate (C) the same results as in Example 2 were obtained.

EXAMPLE 4

A solution consisting of 1280 g. of an 80 % aqueous solution of THPC, 195 g. of guanidine phosphate, 41 g. of melamine and 910 g. of water was heated under reflux for 60 minutes and was then quenched to prepare a precondensate (D). By the same treatment as in Example 2 except using this precondensate (D), the same results as in Example 2 were obtained.

EXAMPLE 5

A solution consisting of 2,500 g. of an 80 % aqueous solution of tetrahis hydroxymethyl phosphonium hydroxide (referred to as THPOH hereinafter), 325 g. of urea, 82 g. of melamine and 1,850 g. of water was heated under reflux for 60 minutes and was then quenched to prepare a precondensate (E). A poplin consisting of 100 % polyester fibers was padded with each of the treating solutions indicated in Table 3, and squeezed to a wet pick up of 75 to 80 %. Then the wet fabric was dried, heat-treated and soaped in the same manner as in Example 1. The results are as shown in Table 3.

Table 3

| Formulation | Test No. | Present invention 1 | 2 | Control 3 |
|---|---|---|---|---|
| Precondensate (E) | (g.) | 100 | 100 | 100 |
| Urea | (g.) | 5 | 10 | 0 |
| Sumitex M-3 | (g.) | 7 | 0 | 0 |
| NaOH | (g.) | 0.5 | 0.5 | 0.5 |
| Water | (g.) | 40 | 40 | 40 |
| Results Fire-proofness*5 (Coil method) (Average value of 4 measurements) | Before laundering | 6.0 | 6.5 | 1.0 |
| | After 5 times laundering | 5.8 | 6.0 | 1.0 |

*5: By JIS-L-1091-1971-Method D.

EXAMPLE 6

A solution consisting of 1500 g. of an 80 % aqueous solution of THPC, 55 g. of ethyl triazone, 195 g. of urea and 1100 g. of water was heated under reflux for 60 minutes and was then quenched to prepare a precondensate (F). By the same treatment as in Example 5 by using this precondensate (F), the same results as in Example 5 were obtained.

EXAMPLE 7

A solution consisting of 1500 g. of an 80 % aqueous solution of THPC, 120 g. of dihydroxyethylene urea, 195 g. of urea and 1100 g. of water was heated under reflux for 60 minutes and was then quenched to prepare a precondensate (G). By the same treatment as in Example 5 by using this precondensate (G), the same results as in Example 5 were obtained.

EXAMPLE 8

A solution consisting of 1920 g. of an 80 % aqueous solution of THPC, 244 g. of urea, 100 g. of ethylene bistriazone and 1360 g. of water was heated under reflux for 60 minutes and was then quenched to prepare a precondensate (H). By the same treatment as in Example 5 by using this precondensate (H), the same results as in Example 5 were obtained.

EXAMPLE 9

A solution consisting of 2560 g. of an 80 % aqueous solution of THPC, 250 g. of tri-N-methyl phosphoric tri-amide, 82 g. of melamine and 1,820 g. of water was heated under reflux for 60 minutes and was then quenched to prepare a precondensate (I). By the same treatment as in Example 5 made by using this precondensate (I), the same results as in Example 5 were obtained.

EXAMPLE 10

A solution consisting of 2,560 g. of an 80 % aqueous solution of THPC, 83 g. of tri-N-methyl phosphoric tri-amide, 75 g. of melamine, 250 g. of urea and 1800 g. of water was heated under reflux for 120 minutes and was then quenched to prepare a precondensate (J). By the same treatment as in Example 5 by using this precondensate (J), the same results as in Example 5 were obtained.

EXAMPLE 11

A poplin consisting of 100 % of polyethylene terephthalate fibers was padded with a treating solution of the following composition was squeezed to a wet pick up of 75 to 80 %. The wet fabric was dried at 80°C. for 8 minutes, then heat-treated at 150°C. for 3 minutes and was then soaped with a solution of 1 g./liter of Soapless Soap at 40°C. for 5 minutes in a domestic laundering machine. The treated fabric had an excellent flame-resistant property and soft hand.

| Composition of the treating solution (% by weight): | |
|---|---|
| Precondensate (A) | 65 |
| NaOH | 0.8 |
| Urea | 3.5 |
| Sumitex M-3 | 5.3 |
| Cetylamine | 0.5 |

EXAMPLE 12

A poplin consisting of 100 % polyethylene terephthalate fibers was treated in the same manner as in Example 11 except that a treating solution shown in the following was used. The treated fabric had an excellent flame-resistant property and soft hand.

| Composition of the treating solution (% by weight): | |
|---|---|
| Precondensate (B) | 65 |
| NaOH | 0.8 |
| Urea | 3.5 |
| Sumitex M-3 | 5.3 |
| 10 % dispersion of stearamide | 5.0 |

EXAMPLE 13

A poplin consisting of 100 % polyethylene terephthalate fibers was treated in the same manner as in Example 11 except that a treating solution shown in the following was used. The treated fabric had an excellent flame-resistant property.

| Composition of the treating solution (% by weight): | |
|---|---|
| Precondensate (A) | 65 |
| NaOH | 0.8 |
| Thiourea | 4.2 |
| Sumitex M-3 | 5.3 |

EXAMPLE 14

By the same treatment as in Example 13 except using a 9.3 % guanidine phosphate instead of 4.2 % thiourea in the composition of the treating solution in Example 13, there was obtained a fabric having an excellent flameresistance.

EXAMPLE 15

By the same treatment as in Example 13 except using Sumitex 901 (a methylolethylene urea resin precondensate produced by Sumitomo Chemical Company, Limited) instead of Sumitex M-3 in the composition of the treating solution in Example 13, a fabric having an excellent flameresistance was obtained.

EXAMPLE 16

By the same treatment as in Example 13 except using Sumitex U-8 (a methylolurone type resin precondensate produced by Sumitomo Chemical Company, Limited) instead of Sumitex M-3 in the composition of the treating solution in Example 13, a treated fabric having an excellent flameresistance was obtained.

EXAMPLE 17

By the same treatment by using 0.7 % KOH instead of NaOH in the composition of the treating solution in Example 13, a treated fabric having a faborable flameresistance was obtained.

EXAMPLE 18

A plain woven fabric consisting of polyethylene terephthalate fibers and cotton fibers (50/50) was padded with the following treating solution containing a commercial flame-retardant for cotton, i.e. Pyrovatex CP (product of Ciba-Geigy AG), was squeezed to a wet pick up of 70 %. The wet fabric was dried at 80°C. for 10 minutes, then heat-treated at 170°C. for 3 minutes and was then soaped with an aqueous solution containing 2 g./liter of $Na_2CO_3$ at 90°C. for 10 minutes.

| Composition of the treating solution (% by weight): | |
|---|---|
| Pyrovatex CP | 40 |
| Sumitex M-6 (Methylolmelamine resin precondensate produced by Sumitomo Chemical Company, Limited) | 8 |
| $NH_4Cl$ | 0.4 |
| Urea | 0.8 |
| Wetting agent | 0.01 |

Then the pretreated fabric was padded with the following treating solution and squeezed to a wet pick up of 75 %. The wet fabric was dried at 80°C. for 8 minutes, then heat-treated at 160°C. for 3 minutes and was soaped with a solution of 1 g./liter of Soapless Soap at 60°C. for 10 minutes in a domestic laundering machine. Composition of the treating solution (% by weight):

| Composition of the treating solution (% by weight): | |
|---|---|
| Precondensate (A) | 50 |
| NaOH | 0.6 |
| Urea | 2.8 |
| Sumitex M-3 | 4.0 |

Even after 20 times of laundering, the treated fabric retained an excellent flame-resistance. For comparison, by treatment with only Pyrovatex CP, no noticeable flame-resistance was obtained.

EXAMPLE 19

By the same treatment as in Example 18 except that a solution of 2 g./liter of 30 % $H_2O_2$ water and 0.2 g./liter of $Na_2CO_3$ was used instead of the Soapless Soap solution in Example 18, there was obtained a fabric having an excellent flame-resistance.

EXAMPLE 20

By the same treatment as in Example 18 except that the following treating solution was used instead of the treating solution containing Pyrovatex in Example 18, there was obtained a fabric having an excellent flame-resistance.

| Composition of the treating solution (% by weight): | |
|---|---|
| MCC - 100 (Reactant resin precondensate produced by Monsanto Co.) | 14.3 |
| MCC - 200 (Flame-retardant produced by Monsanto Co.) | 20.0 |
| MCC - 300 (Catalyst produced by Monsanto Co.) | 4.0 |
| Wetting agent | 0.1 |

EXAMPLE 21

By the same treatment as in Example 18 except that the following treating solution was used instead of the treating solution containing Pyrovatex CP in Example 18, there was obtained a fabric having an excellent flame-resistance.

| Composition of the treating solution (% by weight): | |
|---|---|
| Flameproof MC (Urea-phosphoric acid precondensate produced by Nippon Senka Kogyo, Inc.) | 50 |
| Sumitex VLW (Urea-formalin resin precondensate produced by Sumitomo Chemical Company, Limited) | 10 |
| Octex EM (Softening agent produced by Hodogaya Chemical Co., Ltd.) | 3 |
| $(NH_4)_2HPO_4$ | 5 |

EXAMPLE 22

The procedure of Example 18 was repeated except that, instead of the soaping with the Soapless Soap solution, the fabric was dipped in an aqueous solution of 2 g./liter of 30 % $H_2O_2$ and 0.2 g./liter of $Na_2CO_3$ at 40°C. for 5 minutes, was relaxed with a drum washer at 90°C. for 30 minutes, was then padded with a 2 % aqueous solution of Polon MF-32 (a silicone softening agent produced by Shin-etsu Chemical Co., Ltd.), was squeezed to a wet pick up of 70 % and was dried at 100°C. for 5 minutes. The treated fabric had an excellent flame-resistance and soft hand.

EXAMPLE 23

The procedure of Example 22 was repeated except that after padded with Polon MF-32 in Example 22, the fabric was dried and was then treated with a rubber belt type compressive shrinking machine (Manufactured by Cluett, Peabody & Co., Inc. of U.S.A.). This treated fabric also had a soft hand and excellent flame-resistance.

EXAMPLE 24

The procedure of Example 22 was repeated except that a Circular (a relaxer manufactured by K. K. Hisaka Seisakusho) instead of the drum washer in Example 22. There was obtained a fabric with an excellent flame-resistance.

EXAMPLE 25

A knitted pile fabric of the following structure made with a circular knitting machine was treated in the same manner as in Example 18. There was obtained a knitted fabric with excellent flame-resistance.

| | |
|---|---|
| Pile 1: | |
| Base fabric: | Textured nylon yarns (150 d.) |
| Pile: | Spun yarns of polyester/cotton (30/70 of 20 guages and a weight of 320 g./m.$^2$ |
| Pile 2: | |
| Base fabric: | Textured nylon yarns (150 d.) |
| Pile: | Spun yarns of acrylic fiber/cotton (30/70) fiber of 20 guages and a weight of 320 g./m.$^2$ |

EXAMPLE 26

When a plain woven fabric consisting of Cordelan (polychlal fibers produced by Kohjin Co., Ltd.) and polyethylene terephthalate (40/60) was treated in the same manner as in Example 1, there was obtained a fabric with excellent flame-resistance.

EXAMPLE 27

When a knitted fabric consisting of Kanekalon (modacrylic fibers produced by Kanegafuchi Chemical Industry Co., Ltd.) and polyethylene terephthalate (40/60) was teated in the same manner as in Example 1, there was obtained a fabric having excellent flame-resistance.

EXAMPLE 28

When a needle-punched fabric (thickness 5 mm., weight 140 g./m.$^2$) made of polyethylene terephthalate staples and cotton fibers (50/50) was treated in the same manner as in Example 2, there was obtained a needle-punched fabric high in the flame-resistance.

EXAMPLE 29

A knitted fabric of textured nylon yarns was treated in the same manner as in Example 2 to obtain a knitted fabric high in the flame-resistance.

EXAMPLE 30

When a curtain cloth consisting of acrylic fibers and rayon (40/60) was treated in the same manner as in Example 18, a high flame-resistance was obtained.

EXAMPLE 31

A plain woven fabric consisting of polyethylene terephthalate fibers and cotton (50/50) was padded with the following treating solution containing a commercial resinprocessing agent Permafresh LF (a glyoxal type resin precondensate produced by Japan Reichhold Chemicals, Inc.) and was squeezed to a wet pick up of 65 %. The wet fabric was dried at 80°C. for 8 minutes, then heat-treated at 160°C. for 3 minutes and was soaped with an aqueous solution containing 0.2 g./liter of $Na_2CO_3$ at 60°C. for 3 minutes.

| Composition of the treating solution (% by weight): | |
|---|---|
| Permafresh LF | 13 |
| Catalyst F (Metallic salt catalyst produced by Japan Reichhold Chemicals, Inc.) | 2 |
| Permarose T (Polyethyleneglycol type hydrophilic finishing agent produced by I.C.I.) | 15 |

Then the pretreated fabric was treated in the same manner as in Example 2 to obtain the same results as in Example 2. The crease recovery of this treated fabric was also high.

EXAMPLE 32

A plain woven fabric consisting of polyethylene terephthalate and cotton (50/50) was padded with a 20 % aqueous solution of NaOH, and squeezed to a wet pick up of 50 %. The wet fabric was then dried to a water content of 10 % at 80°C. and was treated in epichlorohydrin at 85°C. for 4 hours. Then this pretreated fabric was further treated in the same manner as in Example 2 to obtain the same results as in Example 2. The wash-and-wear property of the treated fabric was also excellent.

EXAMPLE 33

A plain woven fabric consisting of polyethylene terephthalate and cotton (50/50) was treated in the same manner as in Test No. 1 in Example 2. Then the fabric was padded with the following treating solution and squeezed to a wet pick up of 50 %. The wet fabric was dried at 80°C. for 8 minutes and then heat-treated at 160°C. for 3 minutes.

| Composition of the treating solution (% by weight): | |
|---|---|
| Scotchgard FC-208 (Fluorine type water and oil repellent produced by Sumitomo 3M Co., Ltd.) | 5 |
| Isopropanol | 1 |

The treated fabric has an excellent flame-resistance and water and oil-repellency.

EXAMPLE 34

When a blended fabric of polyethylene terephthalate and wool (50/50) was treated in the same manner as in Example 2, an excellent flame-resistance was obtained.

EXAMPLE 35

When an acrylic jersey was treated in the same manner as in Example 2 and was tested by the U.S. Standard for the Flammability of Children's Sleep Wear (DOC FF3-71), it was found to have an excellent flame-resistance.

EXAMPLE 36

When a Chinon (promix type fibers of Toyobo, Ltd.) fabric was treated in the same manner as in Example 2 and was tested the same as in Example 35, it was found to have an excellent flame-resistance.

EXAMPLE 37

By the same treatment as in Example 18 with the following treating solution after the treatment with the Pyrovatex CP in Example 18, then was obtained a fabric having excellent flame-resistance.

| Composition of the treating solution (% by weight): | |
| --- | --- |
| Precondensate (A) | 50 |
| NaOH | 0.6 |
| Urea | 2.8 |
| Sumitex M-3 | 4.0 |
| Sumitex Accelerator-MX (Magnesium chloride type catalyst produced by Sumitomo Chemical Company, Limited) | 0.5 |

What is claimed is:

1. A composition for imparting fire-proofness to a shaped article of a synthetic resin, which comprises 100 parts by weight of (1) (a) a water-soluble precondensate of a tetrakis hydroxymethyl phosphonium compound and urea or (b) a water-soluble precondensate of a tetrakis hydroxymethyl phosphonium compound, urea and melamine or guanidine in which the ratio of the amount of the methylol groups in the tetrakis hydroxymethyl phosphonium compound to the total amount of the amino groups in the urea, melamine and guanidine is an equivalent ratio of 1:0.1 to 0.5, (2) 2 to 20 parts by weight of a compound selected from the group consisting of urea, thiourea, guanidine carbonate, guanidine phosphate and guanidine hydrochloride and (3) 2 to 15 parts by weight of a methylol resin precondensate having at least one methylol group in the molecule selected from the group consisting of methylolmelamine resin, methylolurea resin, methyloluron resin, methyloltriazone resin, methylolethyleneurea resin, methylolpropyleneurea resin and methylolhydroxyethyleneurea resin.

\* \* \* \* \*